(12) United States Patent
Johnson et al.

(10) Patent No.: US 10,167,982 B2
(45) Date of Patent: Jan. 1, 2019

(54) STACKED DUCT ASSEMBLIES

(71) Applicant: Fluor Technologies Corporation, Sugar Land, TX (US)

(72) Inventors: Dennis W. Johnson, Simpsonville, SC (US); James Brown, Simpsonville, SC (US); Fred Smith, Marietta, OH (US); Kim Jackson, Marietta, SC (US); Brad Smoak, Greenville, SC (US)

(73) Assignee: Fluor Technologies Corporation, Sugar Land, TX (US)

( * ) Notice: Subject to any disclaimer, the term of this patent is extended or adjusted under 35 U.S.C. 154(b) by 224 days.

(21) Appl. No.: 15/205,264

(22) Filed: Jul. 8, 2016

(65) Prior Publication Data

US 2018/0010714 A1    Jan. 11, 2018

(51) Int. Cl.
*F16L 3/00*    (2006.01)
*F16L 3/26*    (2006.01)

(52) U.S. Cl.
CPC ...................... *F16L 3/26* (2013.01)

(58) Field of Classification Search
CPC ............... F16L 3/26; F16L 3/22; F16L 3/327
USPC .......... 138/106, 107, 115–117; 248/68.1, 65, 248/67.7, 163.1, 176.1
See application file for complete search history.

(56) References Cited

U.S. PATENT DOCUMENTS

| | | | |
|---|---|---|---|
| 1,263,953 A | 4/1918 | Smyth et al. | |
| 3,460,856 A | 8/1969 | Tine et al. | |
| 3,593,468 A | 7/1971 | Bustin et al. | |
| 3,599,912 A * | 8/1971 | Stephens | F27D 1/0036 248/58 |
| 3,725,565 A | 4/1973 | Schmidt | |
| 3,730,566 A | 5/1973 | Kazmierski, Jr. et al. | |
| 3,811,714 A | 5/1974 | Pintard | |
| 3,856,246 A * | 12/1974 | Sinko | F16L 3/222 138/112 |
| 3,997,194 A | 12/1976 | Eifer et al. | |
| 4,090,726 A | 5/1978 | Mischel | |
| 4,140,338 A | 2/1979 | Kazmierski, Jr. et al. | |
| 4,159,133 A | 6/1979 | Belanger | |
| 4,215,882 A | 8/1980 | Bosch | |

(Continued)

FOREIGN PATENT DOCUMENTS

CA    2916995 A1    11/2014
DE    1190749 B    4/1965

(Continued)

OTHER PUBLICATIONS

Restriction Requirement dated Feb. 23, 2016, U.S. Appl. No. 13/898,343, filed May 20, 2013.

(Continued)

*Primary Examiner* — Patrick F Brinson
(74) *Attorney, Agent, or Firm* — Conley Rose, PC (57) ABSTRACT

A duct assembly for flowing fluids includes a first duct positioned above the ground. The first duct is configured to flow a first fluid. In addition, the duct assembly includes a second duct positioned above the ground. The second duct is configured to flow a second fluid. The first duct and the second duct isolate the first fluid and the second fluid from each other. Further, the duct assembly includes a stand supporting the first duct and the second duct above the ground. The stand has an upper end positioned below the first duct and the second duct.

16 Claims, 10 Drawing Sheets

(56) References Cited

U.S. PATENT DOCUMENTS

| | | | |
|---|---|---|---|
| 4,244,542 A * | 1/1981 | Mathews | F16L 3/222 138/112 |
| 4,265,473 A | 5/1981 | Russo | |
| 4,601,447 A * | 7/1986 | McFarland | F16L 3/222 248/49 |
| 4,618,114 A * | 10/1986 | McFarland | F16L 3/13 248/220.21 |
| 4,848,803 A | 7/1989 | Bachmann | |
| 5,102,073 A * | 4/1992 | Lestenkof, Jr. | F16L 3/227 138/106 |
| 5,402,073 A * | 3/1995 | Ross | G01R 27/04 324/539 |
| 5,443,290 A | 8/1995 | Boyer et al. | |
| 5,704,657 A | 1/1998 | Asanuma | |
| 6,027,147 A | 2/2000 | Elliott | |
| 6,142,428 A * | 11/2000 | Kamata | F16L 3/1207 248/49 |
| 6,402,203 B1 | 6/2002 | Mathiesen et al. | |
| 7,284,771 B2 | 10/2007 | Baumann et al. | |
| 8,033,576 B2 | 10/2011 | Argersinger | |
| 8,376,290 B2 * | 2/2013 | Tollefson | E04B 5/48 248/49 |
| 9,702,494 B2 | 7/2017 | Johnson et al. | |
| 2009/0194266 A1 | 8/2009 | Conrad et al. | |
| 2011/0303456 A1 * | 12/2011 | Blanchard | F16L 3/1091 174/480 |
| 2014/0290783 A1 | 10/2014 | Fanelli | |
| 2014/0339815 A1 | 11/2014 | Johnson et al. | |

FOREIGN PATENT DOCUMENTS

| | | |
|---|---|---|
| DE | 3819086 A1 | 12/1989 |
| EP | 0519636 A1 | 12/1992 |
| EP | 0879986 A2 | 11/1998 |
| EP | 2999911 A1 | 3/2016 |
| FR | 2266095 A1 | 10/1975 |
| FR | 2274859 A1 | 1/1976 |
| FR | 2643699 A1 | 8/1990 |
| FR | 2751048 A1 | 1/1998 |
| JP | 2002031396 A | 1/2002 |
| JP | 2009180253 A | 8/2009 |
| KR | 1020150141331 | 12/2015 |
| WO | WO2014189489 A1 | 11/2014 |
| WO | WO2018009228 A1 | 1/2018 |

OTHER PUBLICATIONS

Office Action dated May 6, 2016, U.S. Appl. No. 13/898,343, filed May 20, 2013.
Final Office Action dated Oct. 26, 2016, U.S. Appl. No. 13/898,343, filed May 20, 2013.
Advisory Action dated Jan. 1, 2017, U.S. Appl. No. 13/898,343, filed May 20, 2013.
Advisory Action dated Mar. 2, 2017, U.S. Appl. No. 13/898,343, filed May 20, 2013.
Notice of Allowance dated Mar. 9, 2017, U.S. Appl. No. 13/898,343, filed May 20, 2013.
Office Action dated Nov. 17, 2016, Canada Patent Application No. 2,916,995, dated May 20, 2013.
Notice of Allowance dated May 30, 2017, Canada Patent Application No. 2,916,995, dated May 20, 2013.
Extended European Search Report dated Dec. 22, 2016, Europe Patent Application No. 13885074.8, filed Dec. 16, 2015.
Foreign Communication from a Related Counterpart—International Search Report and Written Opinion dated Apr. 10, 2017, PCT/US2016/041770, filed on Jul. 11, 2016.
Foreign Communication from a Related Counterpart—International Search Report and Written Opinion dated Feb. 12, 2014, International Application No. PCT/US2013/041899, filed May 20, 2013.
Foreign Communication from a Related Counterpart—International Preliminary Report on Patentability dated Nov. 24, 2015, International Application No. PCT/US2013/041899, filed May 20, 2013.
Communication Under Rule 71(3) EPC dated Jun. 22, 2018, Europe Patent Application No. 13885074.8, filed Dec. 16, 2015.
American Society of Civil Engineers, The Structural Design of Air and Gas Ducts for Power Stations and Industrial Boiler Applications, Aug. 1995, Danvers, MA., Sections 1.4.1, 1.4.2, 2.3.1, and 2.3.3, 25 pages, downloaded from asce library.org on Apr. 6, 2018.

* cited by examiner

STACKED DUCT ASSEMBLIES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The disclosure relates generally to duct assemblies for transporting fluids such as exhaust gas from a combustion process and clean air to a combustion process. More particularly, the disclosure relates to duct assemblies that utilize a reduced amount of materials resulting in reduced material and construction costs.

Many industrial plants include furnaces, water heaters, and boilers that rely on combustion to generate heat, electricity, steam, or hot water, or to incinerate waste materials or residues. Duct assemblies are typically used to supply clean air to the combustion process and to transport dirty flue gas from the combustion process. Due to space limitations or other reasons, some duct assemblies can extend over relatively long distances (e.g., over 50 ft.). In addition, many duct assemblies are spaced above the ground so as not to interfere with plant operations and to enable easy access to the various equipment at the plant. Accordingly, many duct assemblies include rigid support structures for supporting the individual ducts above the ground. For example, referring now to FIGS. 1 and 2, a conventional duct assembly 10 is shown. Duct assembly 10 includes a lower duct 20 spaced above the ground 11, an upper duct 30 vertically spaced above lower duct 20, and a plurality of horizontally-spaced duct support stands 40 that support ducts 20, 30 above the ground 11. Stands 40 are spaced apart a distance $D_{40}$. Ducts 20, 30 extend from stand 40 to stand 40, and thus, the portions of ducts 20, 30 spanning between each pair of adjacent stands 40 are not directly supported by stands 40.

Figure 1:
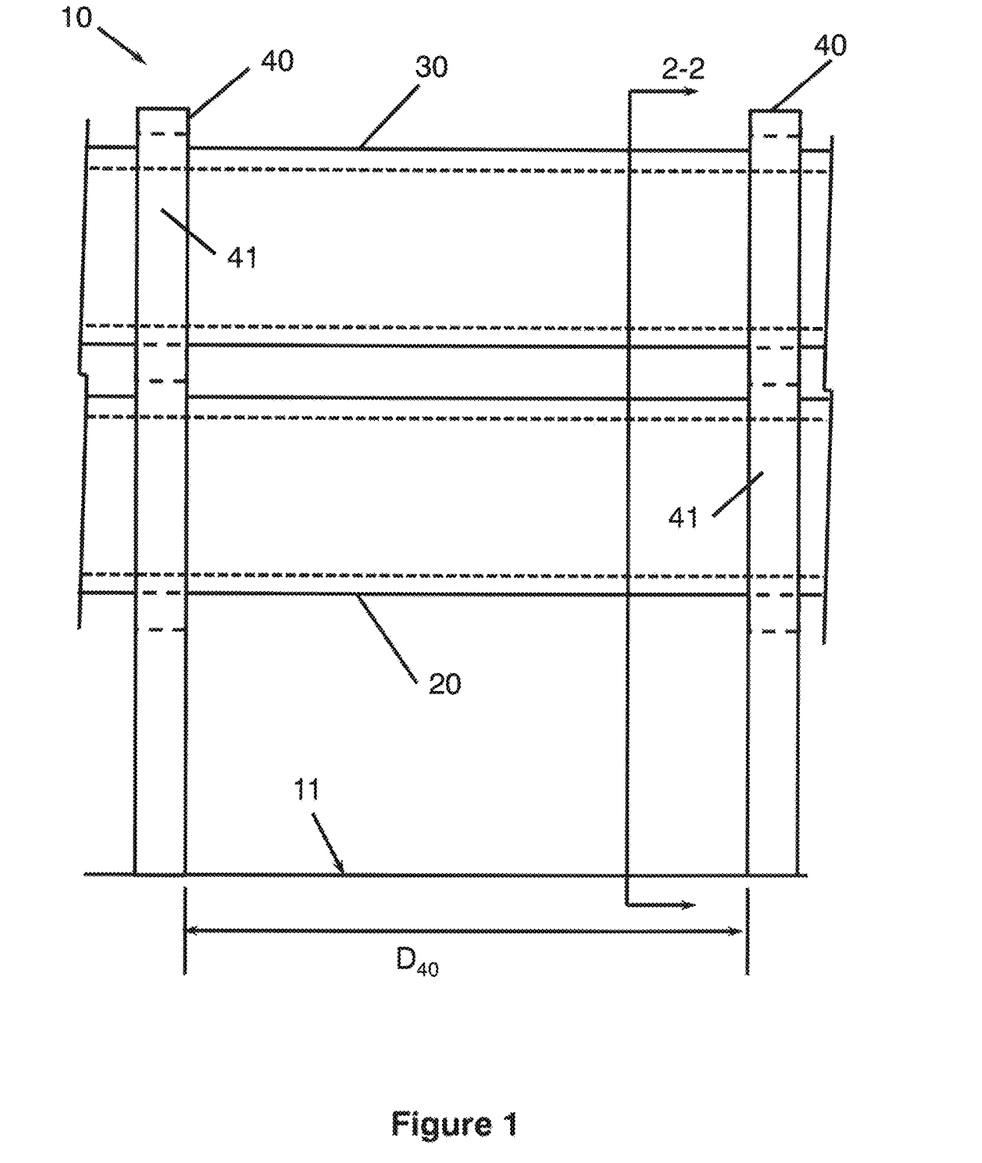
FIG. 1 is a partial side view of a conventional stacked duct assembly.
Figure 2:
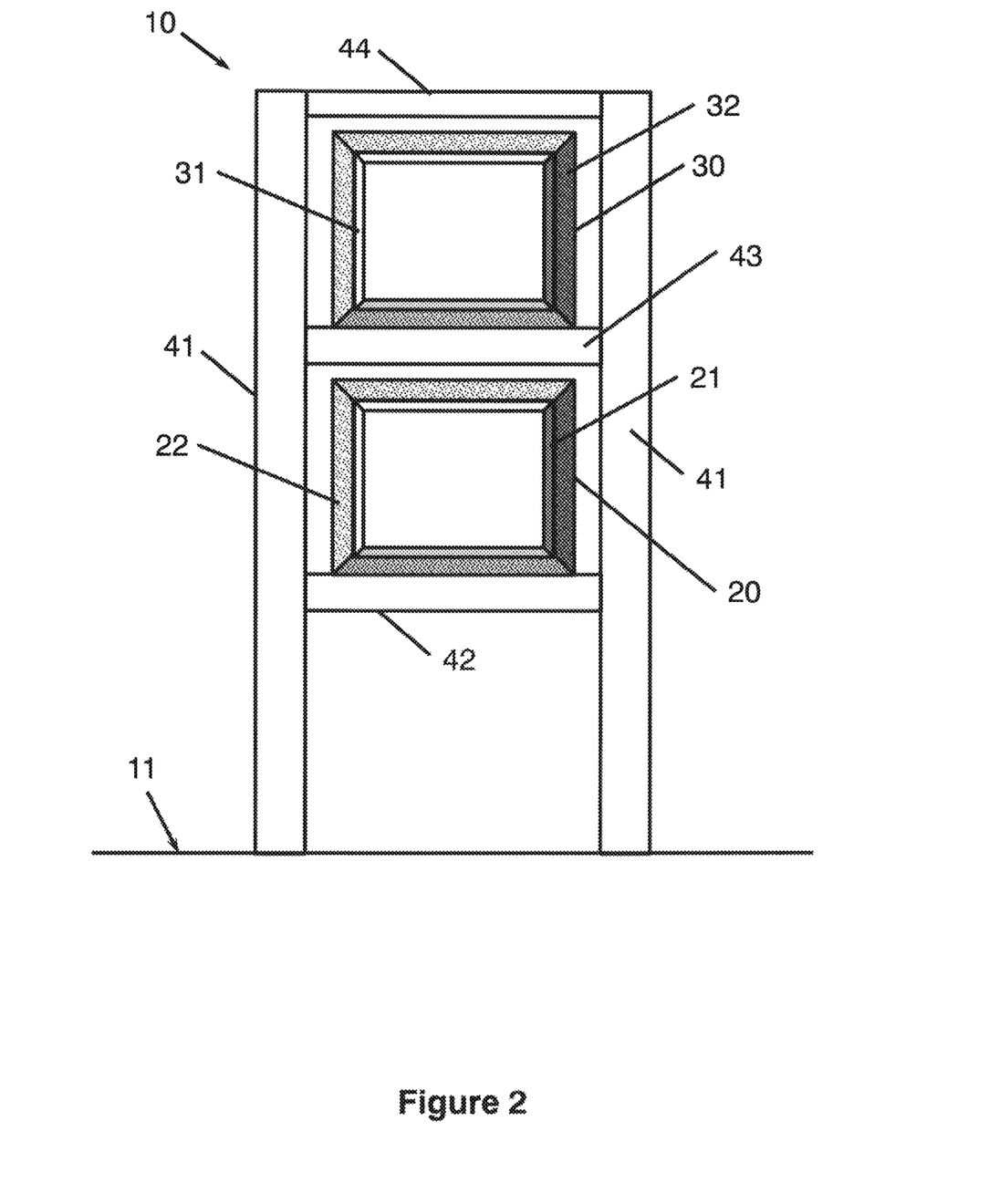
FIG. 2 is a cross-sectional view of the stacked duct assembly of FIG. 1 taken along section 2-2 of FIG. 1.

Each duct 20, 30 includes an inner conduit 21, 31, respectively, and insulation 22, 32, respectively, that surrounds the entire perimeter of the corresponding inner conduit 21, 31. Each support stand 40 includes a pair of horizontally-spaced, vertical steel columns 41 and a plurality of transverse beams 42, 43, 44 extending horizontally between columns 41. In particular, lower transverse beam 42 is vertically disposed below both ducts 20, 30, intermediate transverse beam 43 is vertically disposed between ducts 20, 30, and upper transverse beam 44 is vertically disposed above ducts 20, 30. Transverse beams 42, 43, 44 provide structural integrity to stand 40 and maintain the relative spacing and positions of columns 41. In addition, lower transverse beam 42 directly supports lower duct 20, and intermediate transverse beam 43 directly supports upper duct 30. Accordingly, each beam 42, 43 must be sufficiently rigid and strong to support the weight of the corresponding duct 20, 30, respectively, and columns 41 must be sufficiently rigid and strong to support the weight of beams 42, 43, 44 and ducts 20, 30.

BRIEF SUMMARY OF THE DISCLOSURE

Embodiments of duct assemblies for flowing fluids are disclosed herein. In one embodiment, a duct assembly comprises a first duct positioned above the ground. The first duct is configured to flow a first fluid. In addition, the duct assembly comprises a second duct positioned above the ground. The second duct is configured to flow a second fluid. The first duct and the second duct isolate the first fluid and the second fluid from each other. Further, the duct assembly comprises a stand supporting the first duct and the second duct above the ground. The stand has an upper end positioned below the first duct and the second duct.

In another embodiment, a duct assembly for flowing fluids comprises a first duct positioned at a first height measured vertically from the ground. In addition, the duct assembly comprises a stand supporting the first duct above the ground. The stand has an upper end positioned disposed at a second height measured vertically from the ground. The second height is less than or equal to the first height.

In yet another embodiment, duct assembly for flowing fluids comprises a first duct having a first longitudinal axis and configured to flow the first fluid. In addition, the duct assembly comprises a second duct positioned above the first duct. The second duct has a second longitudinal axis oriented parallel to the first longitudinal axis. The second duct is configured to flow the second fluid. Further, the duct assembly comprises a plurality of laterally spaced struts vertically disposed between a first fluid conduit of the first duct and a second fluid conduit of the second duct.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims will be made for purposes of clarity, with "up", "upper", "upwardly" or "upstream" meaning toward the surface of the borehole and with "down", "lower", "downwardly" or "downstream" meaning toward the terminal end of the borehole, regardless of the borehole orientation.

As shown in FIGS. 1 and 2, each conventional duct support stand 40 is constructed by connecting five steel structural members—a pair of vertical steel columns 41 and three steel transverse beams 42, 43, 44 extending between columns 41. Consequently, each stand 40 requires a relatively large quantity of steel and is typically constructed in a series of discrete steps. In addition, each column 41 extends from the ground 11 to an upper end disposed above upper duct 30, and each beam 42, 43, 44 is disposed above the ground 11. As a result, each stand 40 has a height greater than the height of the upper duct 30 and a relatively high center of gravity, which may reduce the stability of each stand 40, particularly when exposed to environmental loads such as wind loads or seismic vibrations. Further, upper duct 30 is vertically spaced above lower duct 20 with intermediate transverse beam 43 disposed therebetween. To ensure each inner conduit 21, 31 is sufficiently insulated, insulation 22, 32 is typically disposed about the entire outer perimeter of each duct 20, 30 (i.e., the opposed outer surfaces of ducts 20, 30 are independently insulated). Still further, the portions of ducts 20, 30 extending between stands 40 are not directly supported, and thus, must be capable of withstanding shear loads and bending moments without buckling. However, since ducts 20, 30 are typically not reinforced, the distance $D_{40}$ between each pair of adjacent stands 40 must be kept sufficiently small to reduce the shear loads and bending moments applied to ducts 20, 30 to ensure the integrity of ducts 20, 30 can be maintained along those portions disposed between stands 40.

Embodiments described herein offer the potential to overcome some of the aforementioned shortcomings of conventional duct assemblies (e.g., duct assembly 10). As will be described in more detail below, embodiments described herein offer the potential to reduce the quantity of steel needed to support multiple ducts above the ground, reduce the amount of insulation needed to sufficiently insulate such ducts, lower the center of gravity of the duct support stands, simplify the construction sequence of duct support stands, and increase the distance between each pair of adjacent duct support stands as compared to most conventional duct assemblies. These potential advantages can reduce material, construction, and installation costs, as well as enhance the overall stability of the duct assembly.

Figure 3:
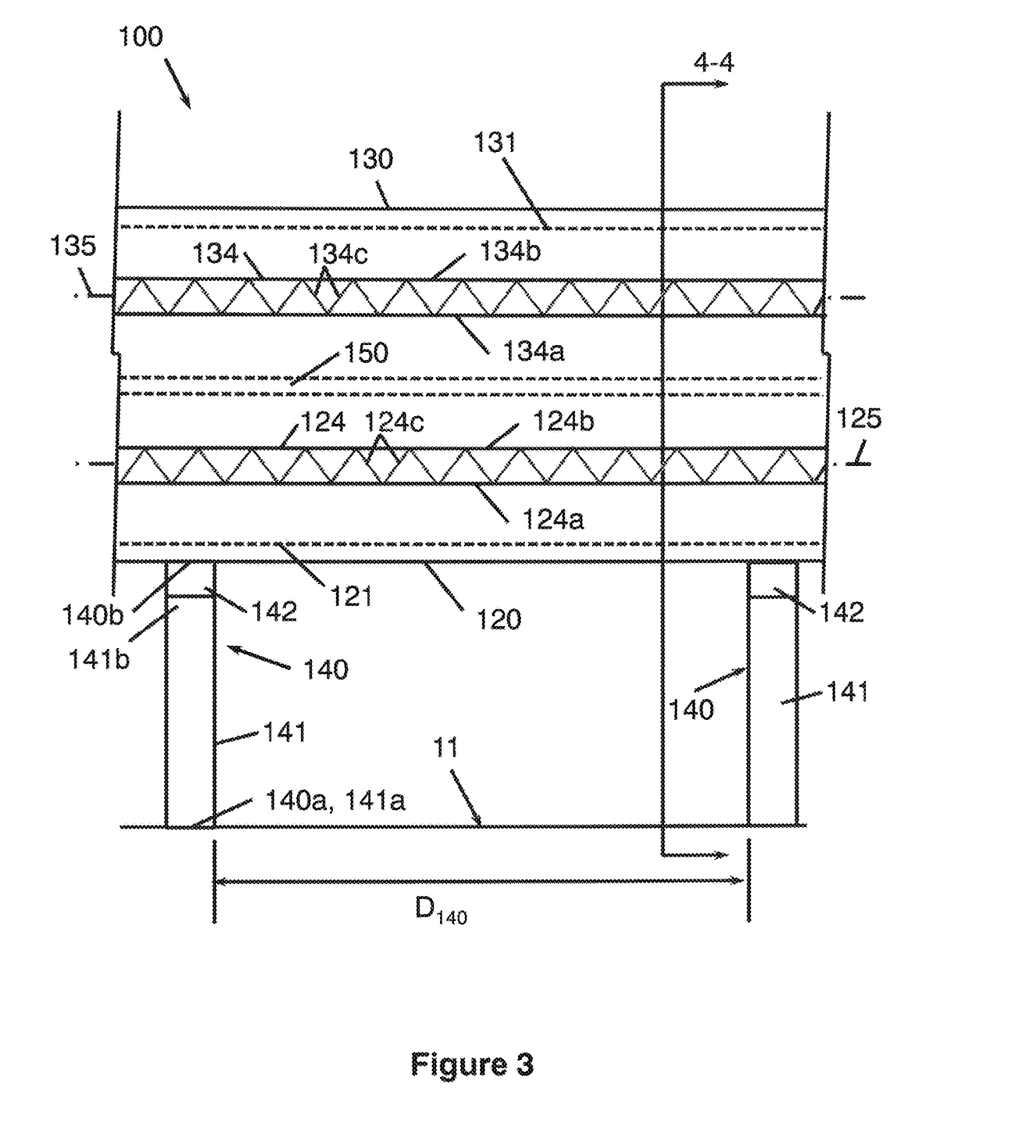
FIG. 3 is a partial side view of an embodiment of a stacked duct assembly in accordance with the principles described herein.
Figure 4:
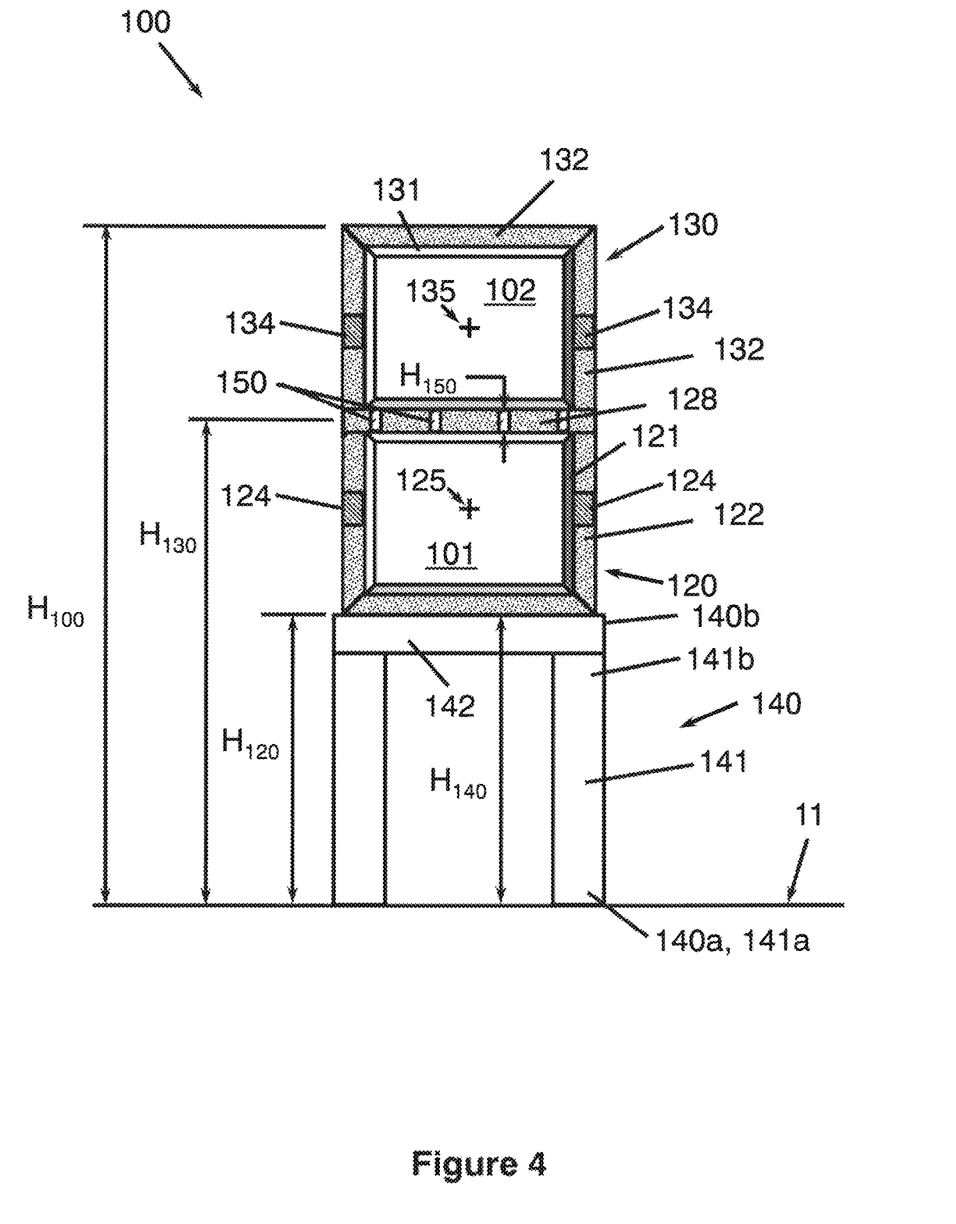
FIG. 4 is a cross-sectional view of the stacked duct assembly of FIG. 3 taken along section 4-4 of FIG. 3.

Referring now to FIGS. 3 and 4, an embodiment of a stacked duct assembly 100 in accordance with the principles described herein is shown. In this embodiment, duct assembly 100 includes a first or lower duct 120 spaced above the ground 11, a second or upper duct 130 positioned on top of lower duct 120, and a plurality of horizontally-spaced duct support stands 140 that support ducts 120, 130 above the ground 11. In general, ducts 120, 130 flow or transport fluids between different locations (e.g., to and from a combustion process in a plant). Stands 140 are spaced apart a horizontal distance $D_{140}$. Ducts 120, 130 extend from stand 140 to stand 140, spanning each distance $D_{140}$ between stands 140. In this embodiment, ducts 120, 130 are oriented parallel to each other. In particular, each duct 120, 130 has a central or longitudinal axis 125, 135, respectively, and axes 125, 135 are oriented parallel to each other.

Duct assembly 100 has an overall height $H_{100}$ measured vertically from the ground 11 to the upper most point of assembly 100, lower duct 120 is disposed at a height $H_{120}$ measured vertically from the ground 11 to the bottom of duct. 120, and upper duct 130 is disposed at a height $H_{130}$ measured vertically from the ground 11 to the bottom of upper duct 130. In this embodiment, the top of upper duct 130 defines the uppermost point of assembly 100, and thus, height $H_{100}$ is measured vertically from the ground 11 to the top of upper duct 130. In many plants, it is desirable to position lower duct 120 above the ground 11 to allow movement of personnel and equipment underneath lower duct 120. In other words, ducts 120, 130 are raised off the ground 11 so as not to interfere with the movement of personnel and equipment at the plant. In general, the height $H_{120}$ at which lower duct 120 is positioned above the ground 11 can vary from plant-to-plant and vary along the length of assembly 100, however, in most cases, the height $H_{120}$ is greater than 6 ft. Although ducts 120, 130 are positioned above the ground 11, the overall height $H_{100}$, the height $H_{120}$ of duct 120, and the height $H_{130}$ of duct 130 are each preferably minimized (i,e., as small as possible) to lower the center of gravity of duct assembly 100, thereby enhancing its stability.

Lower duct 120 includes an inner fluid conduit 121 and insulation 122 mounted to the outside of conduit 121. Upper duct 130 includes an inner conduit 131 and insulation 132 mounted to the outside of conduit 131. Fluid conduits 121, 131 extend along axes 125, 135, respectively, and define fluid flow paths within ducts 120, 130, respectively. Conduits 121, 131 are fluidly isolated from each other and the surrounding environment.

In this embodiment, "shared" insulation 128 is provided between inner conduits 121, 131. In other words, insulation 122 surrounds the entire perimeter of inner conduit 121 except for the lower surface of conduit 121 facing conduit 131, insulation 132 surrounds the entire perimeter of inner conduit 131 except for the upper surface of conduit 131 facing conduit 121, and shared insulation 128 extends between the opposed upper and lower surfaces of conduits 121, 131, respectively. Thus, each inner conduit 121, 131 is insulated along its entire outer perimeter, with the opposed outer surfaces of inner conduits 121, 131 being insulated by one layer of the same insulation 128.

To prevent direct contact between inner conduits 121, 131 and provide sufficient space for shared insulation 128, a plurality of laterally-spaced elongate legs or struts 150 are positioned between inner conduits 121, 131. Each strut 150 extends vertically from the upper surface of inner conduit 121 to the lower surface of inner conduit 131 and extends longitudinally (i.e., parallel to axes 125, 135) along the length of conduits 121, 131, thereby maintaining the uniform spacing of conduits 121, 131. In general, each strut 150 can be secured to conduit 121, conduit 131, or both conduits 121, 131.

Although shared insulation 128 is provided between inner conduits 121, 131 and struts 150 in this embodiment, in other embodiments, no insulation is provided between inner conduits 121, 131 and struts 150. In such embodiments, the air between inner conduits 121, 131 and struts 150 is relied on to control and limit the transfer of thermal energy between conduits 121, 131. In other words, the air between inner conduits 121, 131 and struts 150 functions as insulation.

Each strut 150 has a vertical height $H_{150}$ that defines the vertical spacing between conduits 121, 131. The height $H_{150}$ impacts the overall height $H_{100}$ of assembly 100 and the height $H_{130}$ of upper duct 130 (i.e., as height $H_{150}$ increases, heights $H_{100}$, $H_{130}$ increase; and as height $H_{150}$ decreases, heights $H_{100}$, $H_{130}$ decrease). As previously described, the overall height $H_{100}$ of assembly 100 and the height $H_{130}$ of upper duct 130 are preferably minimized. Accordingly, the height $H_{150}$ is preferably minimized, while ensuring sufficient insulation of inner conduits 121, 131. In embodiments described herein, the height $H_{150}$, and hence the spacing between conduits 121, 131, is preferably between 0 in. (e.g., for ducts including conduits that share a common wall) and 36.0 in.

Each strut 150 is made of a material with sufficient strength to maintain the spacing of conduits 121, 131 and sufficient durability to withstand environmental and thermal loads. In this embodiment, each strut 150 is made of steel. Although four struts 150 are shown between conduits 121, 131 in this embodiment, in general, any suitable number of struts (e.g., struts 150) can be provided depending on a variety of factors including, without limitation, the size of conduits 121, 131., the weight of upper duct 130, and anticipated conditions to be experienced by the struts (e.g., temperature, pressure, etc.).

In this embodiment, inner conduits 121, 131 are the same In particular, each conduit 121, 131 includes a frame with sheathing (e.g., sheet metal) mounted thereto, thereby defining a generally closed inner flow path for fluids. The materials used to make the frame and sheathing can be varied tailored based on the composition of the fluids flowing through conduits 121, 131. For example, sections of conduits 121, 131 that flow corrosive fluids can be made of or coated with corrosion-resistant materials such as plastic or fiberglass reinforced plastic, whereas sections of conduits 121, 131 that do not flow corrosive fluids can be made of steel.

Figure 5:
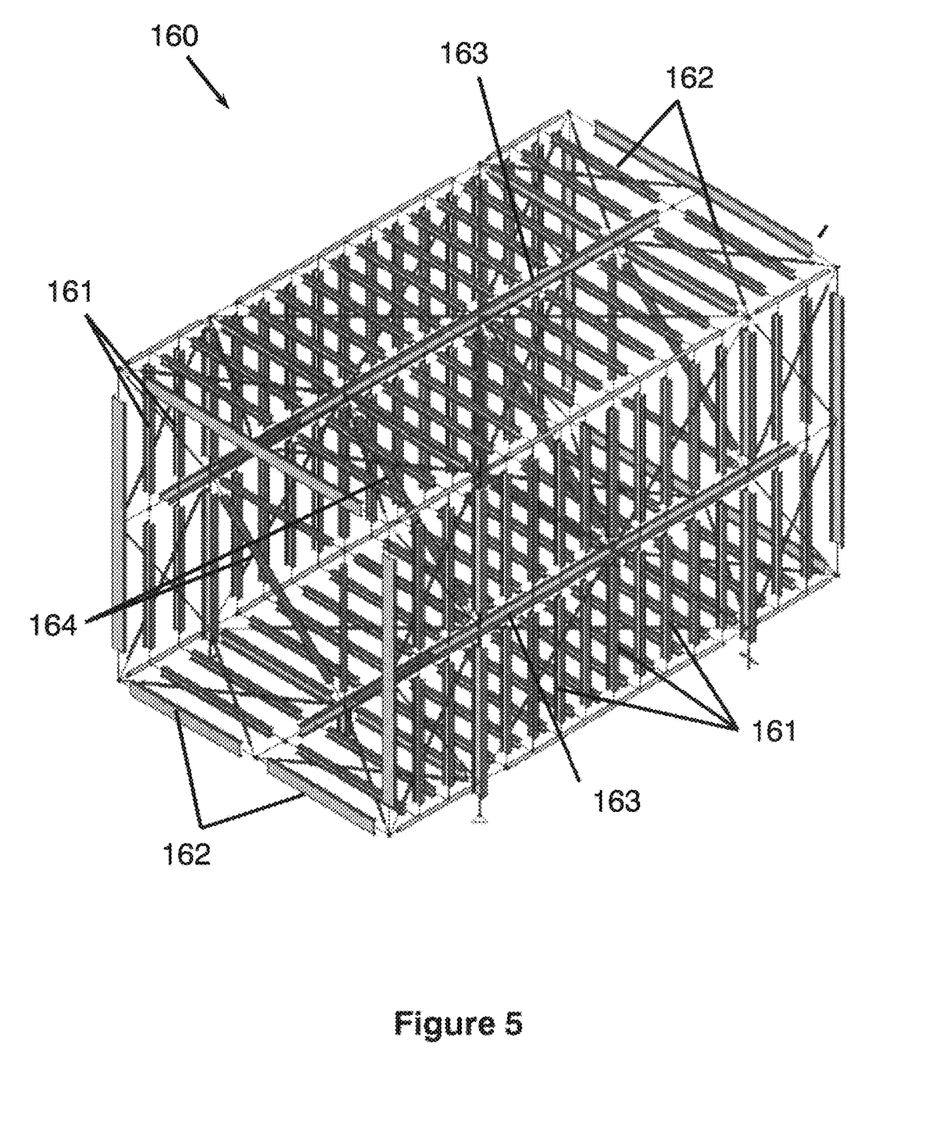
FIG. 5 is an exploded perspective view of a section of an embodiment of a frame that can be used to form the inner conduit of the upper duct or the lower duct of FIG. 3.

Referring briefly to FIG. 5, an exemplary frame 160 that can be used to construct inner conduit 121 and/or inner conduit 131 is shown. In this embodiment, frame 160 is generally rectangular and includes a plurality of parallel vertical stiffening members 161 defining the lateral or side walls of frame 160 and a plurality of parallel horizontal stiffening members 162 defining the top and bottom walls of frame 160. In addition, a horizontal stiffening member 163 is provided along each wall, and a plurality of diagonal reinforcement members 164 extend between the horizontal reinforcement members 163 to brace the walls and maintain the rectangular shape of frame 160. Members 161, 162, 163, 164 are interconnected (e.g., by welding) to form frame 160 and then sheet metal (not shown) is mounted to the outside of frame 160 along each wall to form the conduit. It should be appreciated that frame 160 is only one example of a structure.

Referring again to FIGS. 3 and 4, in this embodiment, a plurality of elongate support or reinforcement members 124 are fixably attached to inner conduit 121 and a plurality of elongate support or reinforcement members 134 are fixably attached to inner conduit 131. Reinforcement members 124, 134 are oriented parallel to longitudinal axes 125, 135, and function to increase the rigidity of conduits 121, 131 to enhance the ability of conduits 121, 131 to withstand shear loads and bending moments, particularly along the sections of conduits 121, 131 spanning between stands 140. Accordingly, reinforcement members 124, 134 preferably extend along the entire length of each section of conduit 121, 131, respectively, disposed between adjacent stands 140. In this embodiment, one reinforcement member 124 is fixably attached to each lateral side of inner conduit 121, and one reinforcement member 134 is fixably attached to each lateral side of inner conduit 131.

In general, each reinforcement member 124, 134 can be any elongate, rigid stiffening structure such as a beam (e.g., I beam), an elongate truss structure, an elongate rigid frame, or the like. As best shown in FIG. 3, in this embodiment, each reinforcement member 124, 134 is an elongate truss, and more particularly, an elongate warren truss including a bottom cord 124a, 134a, respectively, a top cord 124b, 134b, respectively, and diagonal members 124c, 134c, respectively, extending between cords 124a, 124b and cords 134a, 134b, respectively.

Figure 6:
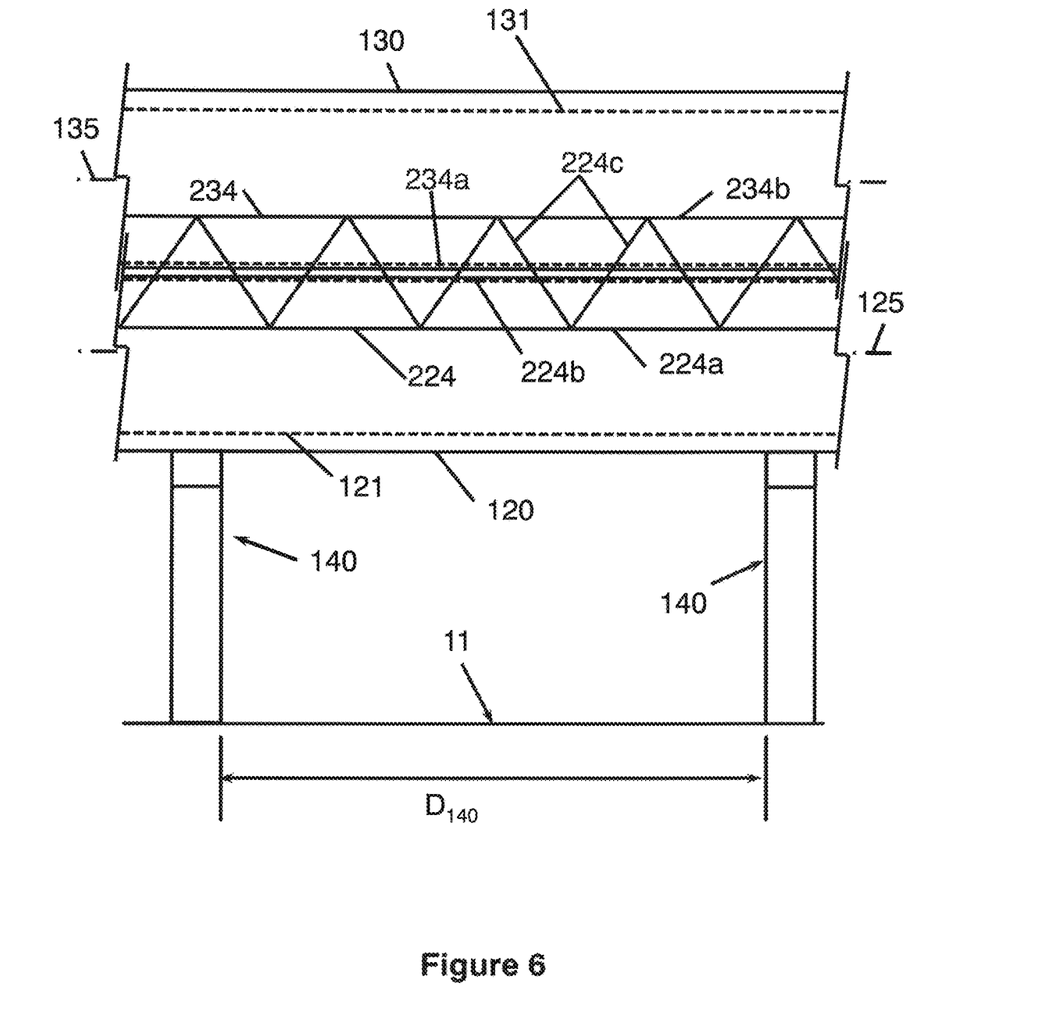
FIG. 6 is a partial side view of an embodiment of a stacked duct assembly in accordance with the principles described herein.

In the embodiment of duct assembly 100 shown in FIG. 3, reinforcement members 124, 134 are spaced apart from each other and are not directly attached to each other. However, in other embodiments, two or more reinforcement members 124, 134 can be directly attached to each other. For example, as shown in FIG. 6, elongate reinforcement members 224, 234 are attached to the lateral sides of inner conduits 121, 131, respectively. Each reinforcement member 224, 234 is a truss structure including a bottom cord 224a, 234a, respectively, and a top cord 224b, 234b, respectively. The top cord 224b of reinforcement member 224 is vertically spaced from the bottom cord 234a of reinforcement member 234. However, in this embodiment, reinforcement members 224, 234 share the same diagonal members 224c. In particular, each diagonal member 224c extends between cords 224a, 234b and is directly attached to each cord 224a, 224b, 234a, 234b.

Referring again to FIGS. 3 and 4, stands 1140 support ducts 120, 130 above the ground 11. In this embodiment, each stand 140 is the same, and thus, one stand 140 will be described it being understood all the stands 140 are the same. Stand 140 has a lower end 140a disposed at the ground 11, an upper end 140b disposed above the ground 11, and a height $H_{140}$ measured vertically from the ground 11 to upper end 140b. Stand 140 directly contacts and supports lower duct 120, and thus, the height $H_{140}$ of stand 140 is the same as the height $H_{120}$ of lower duct 120.

Stand 140 includes a pair of laterally spaced elongate columns or legs 141 and a transverse beam or support base 142 extending between columns 141 at upper end 140b. Columns 141 are parallel and vertically oriented. In particular, each column 141 has a lower end 141a. defining the lower end 140a of stand 140 and an upper end 141b to which base 142 is fixably attached. Stand 140 is entirely disposed below lower duct 120, and thus, upper end 141b of each column 141 is disposed below lower duct 120. In this embodiment, base 142 extends between columns 141 and sits atop upper ends 141b.

Stands 140 support the weight of lower duct 120, upper duct 130, and struts 150, and maintain the position of ducts 120, 130 above the ground 11. Consequently, stands 140 are made of a rigid durable material with sufficient strength to support ducts 120, 130 such as steel.

Although embodiments of duct assembly 100 can be employed to flow any type of fluid(s) between different locations, in this embodiment, duct assembly 100 flows hot, dirty gas away from a combustion process and supplies clean, cool air to the combustion process. As shown in FIG. 4, in this embodiment, the hot gas, designated with reference numeral 101, flows through lower duct 120; whereas the clean, cool air, designated with reference numeral 102, flow through the upper duct 130. In some applications, the dirty gas can have a temperature as high as 300° F. to 400° F., and the clean air 102 can have a temperature between as low as 125° F. to 160° F. Moreover, the temperature of a given fluid flowing through one duct 120, 130 may change significantly as it flows through the duct 120, 130. For example, the hot gas may decrease in temperature as it moves through duct 120 away from the combustion process. In cases where there is a significant temperature difference between the fluids flowing in ducts 120, 130 and/or a significant temperature gradient along a duct 120, 130, duct(s) 120, 130 may expand or contract. If it is desired to allow relative movement between ducts 120, 130, struts 150 are preferably only fixably secured to one inner conduit 121, 131 such that the other inner conduit 121, 131 is free to glide or slide along struts 150, and further, reinforcement members 124, 134 are preferably not fixably connected together. Expansion joints at periodic locations along duct(s) 120, 130 accommodate for movements, expansion, and contraction. Alternatively, ducts 120, 130 can be fixably coupled together with struts 150 and/or reinforcement members 124, 134 such that they move together, with differences in expansion or contraction between ducts 120, 130 accounted for with expansion joints at periodic locations along duct(s) 120, 130.

In the embodiment of duct assembly 100 previously described and shown in FIGS. 3 and 4, inner conduits 121, 131 are spaced apart by the height $H_{150}$. The spacing of conduits 121, 131 is particularly preferred in embodiments where the fluids flowing therethrough have drastically different temperatures (e.g., gases 101, 102) and/or it is desirable to insulate conduits 121, 131 from each other. However, in some cases, the fluids flowing through the inner conduits (e.g., conduits 121, 131) have a similar temperature and the inner conduits do not need to be insulated from each other. In such cases, the inner conduits do not need to be spaced apart, and generally do not experience relative movement due to thermal gradients.

Figure 7:
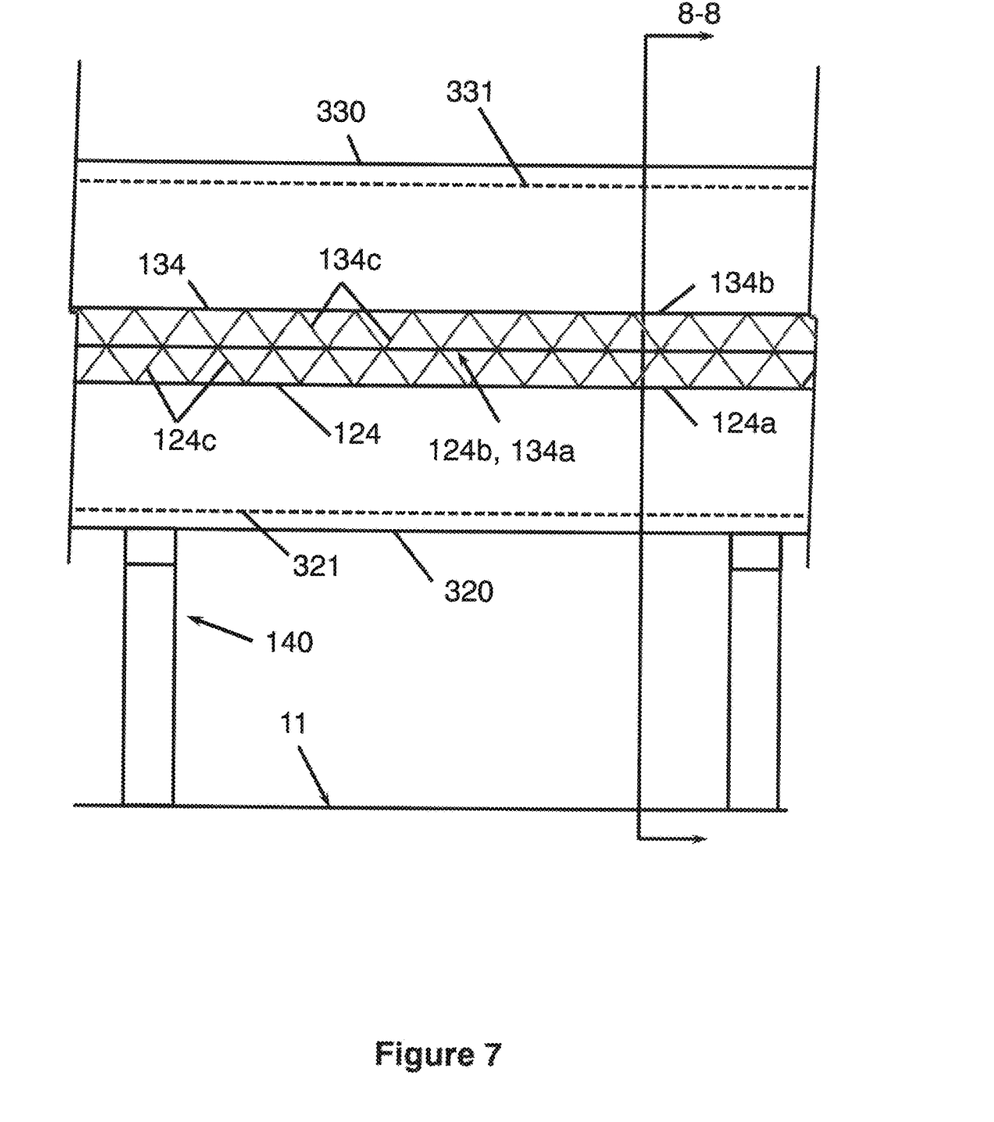
FIG. 7 is a partial side view of an embodiment of a stacked duct assembly in accordance with the principles described herein.
Figure 8:
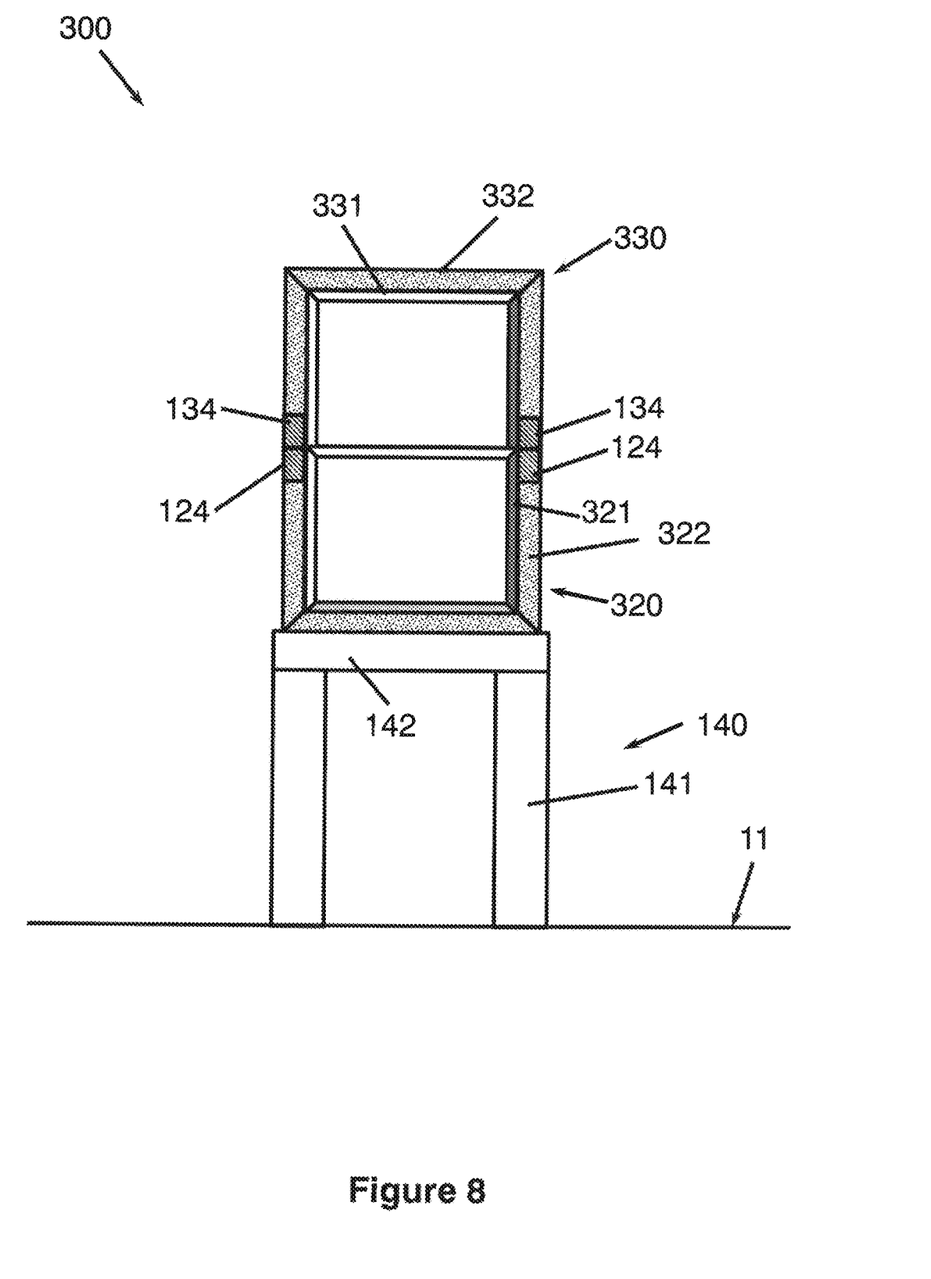
FIG. 8 is a cross-sectional view of the stacked duct assembly of FIG. 7 taken along section 8-8 of FIG. 7.

Referring now to FIGS. 7 and 8, an embodiment of a duct assembly 300 is shown. Duct assembly 300 is similar to duct assembly 100 previously described. Namely, duct assembly 300 includes lower duct 320, upper duct 330, and stand 140. Lower duct 320 includes an inner fluid conduit 321 and outer insulation 322, and upper duct 330 includes an inner fluid conduit 331 and outer insulation 332. However, in this embodiment, fluid conduits 321, 331 are not spaced apart, rather, inner conduits 321, 331 share a common wall. In other words, struts 150 are not provided between inner conduits 321, 331 in this embodiment. Insulation 322 surrounds the outer walls of inner conduit 321, and insulation 332 surrounds the outer walls of inner conduit 331, thereby insulating conduits 321, 331 from the surrounding environment, although conduits 321, 331 are not insulated from each other. Further, in this embodiment, each duct 320, 330 includes a pair of reinforcement members 124, 134 as previously described fixably attached to inner conduit 321, 331, respectively. However, in this embodiment, reinforcement members 124, 134 on each lateral side of ducts 320, 330 are fixably attached together generally at the junction between conduits 321, 331—bottom cord 134a of each reinforcement member 134 is fixably attached to the top cord 124b of the vertically adjacent reinforcement member 124.

Figure 9:
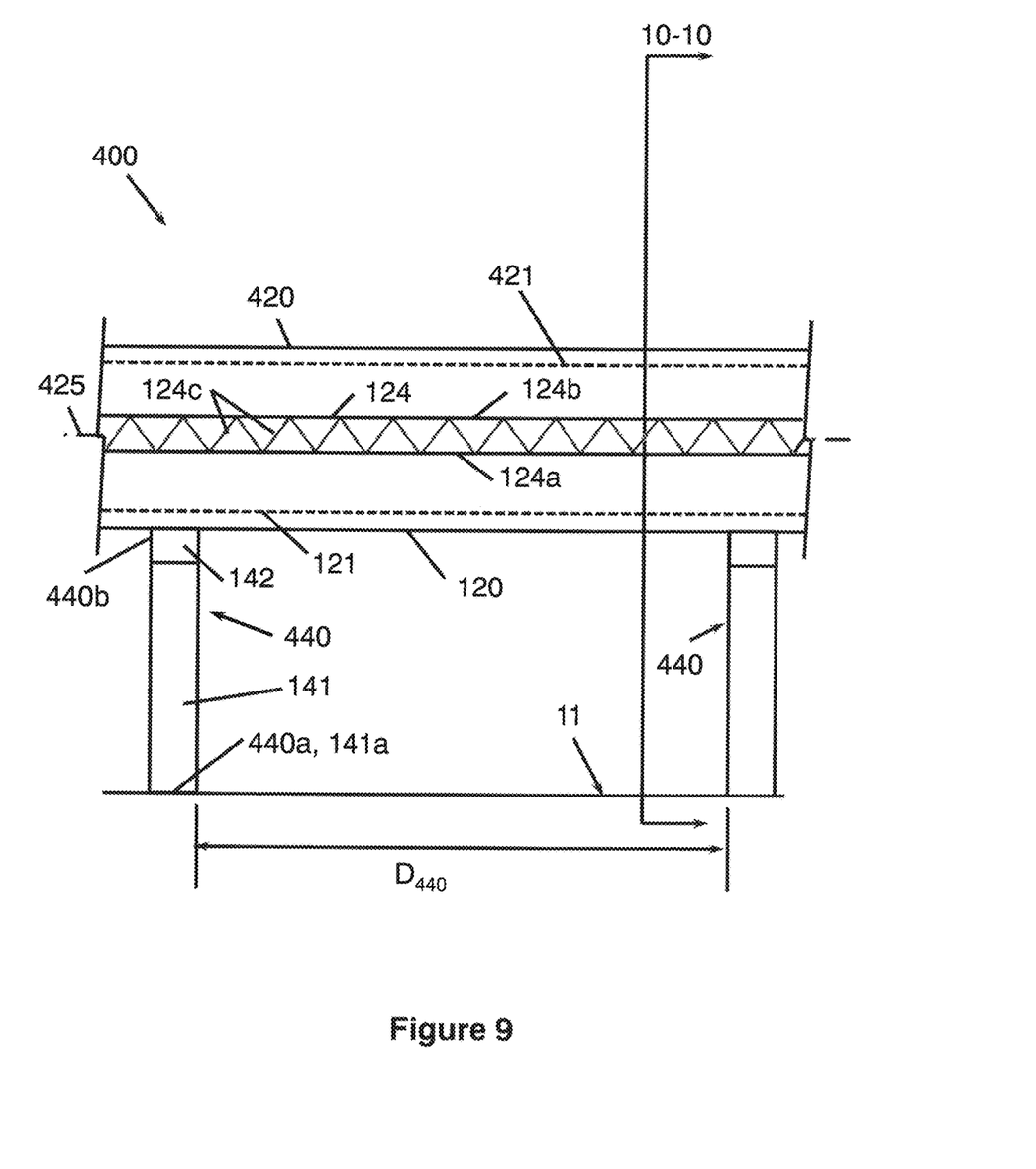
FIG. 9 is a partial side view of an embodiment of a side-by-side duct assembly in accordance with the principles described herein.
Figure 10:
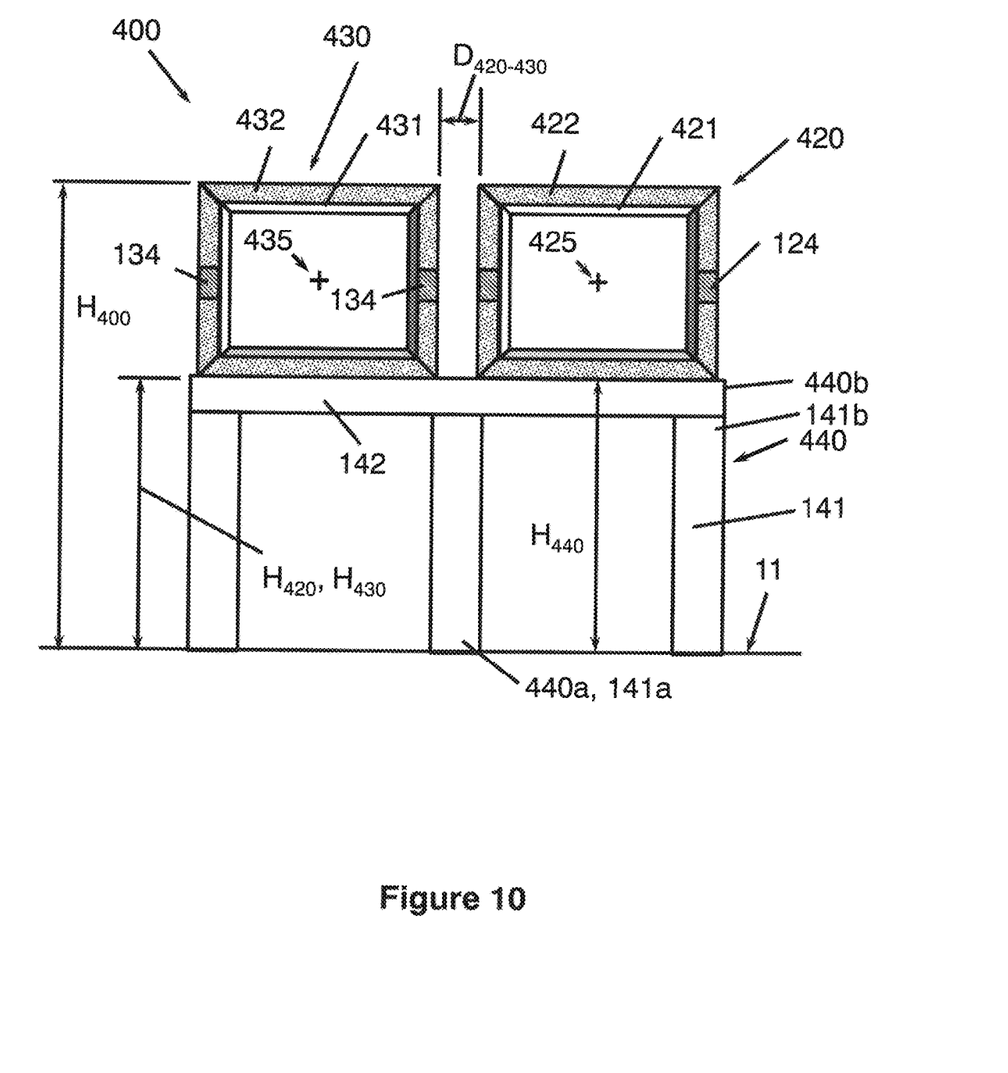
FIG. 10 is a cross-sectional view of the side-by-side duct assembly of FIG. 9 taken along section 10-10 of FIG. 9.

Referring now to FIGS. 9 and 10, another embodiment of a duct assembly 400 is shown. In this embodiment, duct assembly 400 includes a first duct 420 spaced above the ground 11, a second duct 430 spaced above the ground and laterally adjacent to first duct 420, and a plurality of horizontally-spaced duct support stands 440 that support ducts 420, 430 above the ground 11. In general, ducts 420, 430 flow or transport fluids between different locations (e.g., to and from a combustion process in a plant). Stands 440 are spaced apart a horizontal distance $D_{440}$. Ducts 420, 430 extend from stand 440 to stand 440, spanning each distance $D_{440}$ between stands 440. In this embodiment, ducts 420, 430 are oriented parallel to each other.

Duct assembly 400 has an overall height $H_{400}$ measured vertically from the ground 11 to the upper most point of assembly 400, first duct 420 is disposed at a height $H_{420}$ measured vertically from the ground 11 to the bottom of duct 420, and second duct 430 is disposed at a height $H_{430}$ measured vertically from the ground 11 to the bottom of duct 430. In this embodiment, ducts 420, 430 are positioned side-by-side., have the same size, and are disposed at the same height relative to the ground 11. Thus, heights $H_{420}$, $H_{430}$ are equal, and the overall height $H_{400}$ of duct assembly 400 is measured vertically from the ground 11 to the top of either duct 420, 430. For the same reasons as previously described, the height $H_{420}$, $H_{430}$ at which ducts 420, 430 are positioned above the ground 11 can vary from plant-to-plant and vary along the length of assembly 400, however, in most cases, the height $H_{420}$, $H_{430}$ is greater than 6 ft. Although ducts 420, 430 are positioned above the ground 11, the overall height $H_{400}$, the height $H_{420}$, $H_{430}$ of ducts 420, 430 are each preferably minimized (i.e., as small as possible) to lower the center of gravity of duct assembly 400, thereby enhancing its stability. In this embodiment, ducts 420, 430 are side-by-side as opposed to being vertically stacked, and thus, the overall height $H_{400}$ of duct assembly 400 and its center of gravity can be significantly reduced as compared to duct assembly 100 previously described.

Ducts 420, 430 are laterally spaced apart a distance $D_{420-430}$. In general, the distance $D_{420-430}$ can be varied, as desired, to enable access between ducts 420, 430 for maintenance or inspection. However, to minimize the width and footprint of duct assembly 400, the distance $D_{420-430}$ is preferably kept as small as reasonably possible. In embodiments described herein, the distance $D_{420-430}$ is preferably between 0 in. (e.g., for ducts including conduits that share a common wail) and 36.0 in.

Each duct 420, 430 has a central or longitudinal axis 425, 435, respectively, and axes 425, 435 are parallel to each other. In this embodiment, ducts 420, 430 are the same. In particular, each duct 420, 430 includes an inner conduit 421, 431, respectively, and insulation 422, 432, respectively, mounted to the outside of the corresponding conduit 421, 431. In this embodiment, insulation 422, 432 completely surrounds and covers the outer perimeter of inner conduit 421, 432, respectively. Inner conduits 421, 431 define fluid flow paths within ducts 420, 430, respectively. More specifically, each conduit 421, 431 includes a frame (e.g., frame 160 shown in FIG. 5) with sheathing (e.g., sheet metal) mounted thereto, thereby defining a generally closed inner flow path for fluids. The materials used to make the frame and sheathing can be varied tailored based on the composition of the fluids flowing through conduits 421, 431. For example, sections of conduits 421, 431 that flow corrosive fluids can be made of or coated with corrosion resistant materials such as plastic or fiberglass reinforced plastic, whereas sections of conduits 421, 431 that do not flow corrosive fluids can be made of steel. Conduits 421, 431 are fluidly isolated from each other and the surrounding environment.

Although ducts 420, 430 are laterally spaced apart in this embodiment, in other embodiments, ducts 420, 430 directly contact each other. In such embodiments, a single layer of "shared" insulation can be provided between the opposed faces of inner conduits 421, 431 similar to shared insulation 128 between inner conduits 121, 131 shown in FIG. 4.

Referring still to FIGS. 9 and 10, in this embodiment, a plurality of elongate support or reinforcement members 124 are fixably attached to inner conduit 421, and a plurality of elongate support or reinforcement members 134 are fixably attached to inner conduit 431. Reinforcement members 124, 134 are as previously described. Namely, reinforcement members 124, 134 are oriented parallel axes 425, 435 and function to increase the rigidity of conduits 421, 431 to enhance the ability of conduits 421, 431 to withstand shear loads and bending moments, particularly along the sections of conduits 421, 431 spanning between stands 440. Accordingly, reinforcement members 124, 134 preferably extend along the entire length of each section of conduit 421, 431, respectively, disposed between adjacent stands 440. In this embodiment, one reinforcement member 124 is fixably attached to each lateral side of inner conduit 421, and one reinforcement member 134 is fixably attached to each lateral side of inner conduit 431. As previously described, each reinforcement member 124, 134 can be any elongate, rigid stiffening structure such as a beam (e.g., I beam), an elongate truss structure, an elongate rigid frame, or the like. In this embodiment, each reinforcement member 124, 134 is an elongate truss, and more particularly, an elongate warren truss.

Referring still to FIGS. 9 and 10, stands 440 support ducts 420, 430 above the ground 11. In this embodiment, each stand 440 is the same, and thus, one stand 440 will be described it being understood all the stands 440 are the same. Stand 440 has a lower end 440a disposed at the ground 11, an upper end 440b disposed above the ground 11, and a height $H_{440}$ measured vertically from the ground 11 to upper end 440b. Stand 440 directly contacts and supports both duct 420, 430, and thus, the height $H_{440}$ of stand 440 is the same as the height $H_{420}$, $H_{430}$ of duct 420, 430.

Stand 440 includes a plurality of laterally spaced elongate columns or legs 141 and a transverse beam or support base 142 extending between columns 141 at upper end 440b. Columns 141 and support base 142 are as previously described. Namely, columns 141 are parallel and vertically oriented. In addition, each column 141 has a lower end 141a defining the lower end 440a of stand 440 and an upper end 141b to which base 142 is fixably attached. Stand 440 is entirely disposed below ducts 420, 430, and thus, upper end 141h of each column 141 is disposed below ducts 420, 430. In this embodiment, base 142 extends between columns 141 and sits atop upper ends 141b.

Stands 440 supports the weight of both ducts 420, 430, and maintain the position of ducts 420, 430 above the, ground 11. Consequently, stands 440 are made of a rigid durable material with sufficient strength to support ducts 420, 430 such as steel.

In the manner described, embodiments of duct assemblies described herein (e.g., duct assemblies 100, 300, 400) provide systems and methods for supporting a plurality of fluid ducts above the ground. In addition, the embodiments of duct assemblies described herein offer the potential to provide several advantages as compared to most conventional duct assemblies (e.g., duct assembly 10) of similar size. For example, embodiments of duct support stands described herein (e.g., stand 140, 440) are completely positioned below the ducts they support (e,g., ducts 120, 130 and ducts 420, 430). In other words, no portion of the stands described herein extends above or over any duct (e.g., columns 141 do not extend above lower duct 120 or upper duct 130). In addition, embodiments of stands described herein only include one transverse beam (e.g., beam 142). In contrast, conventional stand 40 extends above upper duct 30, columns 41 extend above upper duct 30, and three transverse beams 42, 43, 44 are provided. Consequently, as compared to conventional stand 40, embodiments of stands described herein generally utilize less steel, have a lower center of gravity, and can be constructed in fewer steps. This offers the potential to reduce material and construction costs, as well as enhance the stability of the stand as compared to a similarly-sized conventional stand 40. Still further, embodiments of duct assemblies described herein (e.g., duct assembly 100) do not include a transverse beam disposed between the ducts (e.g., ducts 120, 130). Thus, the opposed sides of the ducts can share a single layer of insulation, thereby potentially further reducing material costs as compared to a similarly-sized conventional stand 40. Moreover, embodiments of duct assemblies described herein include reinforcing members (e.g., reinforcing members 124, 134) that increase the rigidity of the conduits (e.g., conduits 121, 131, 421, 431) and the corresponding ability of the conduits to withstand shear loads and bending moments. Accordingly, the distances between adjacent stands (e.g., distance $D_{140}$ between adjacent stands 140) can be increased as compared to the distance $D_{40}$ between stands 40 of conventional duct assembly of similar/same size. For a given duct run, this offers the potential to reduce the total number of stands and associated material and construction costs.

In general, embodiments described herein can be used to support one or more fluid ducts in any industry or setting including, without limitation, in power plants, steel mills, pulp and paper mills, or the like. Although the individual ducts described herein (e.g., ducts 120, 130, 420, 430) are shown as having a rectangular cross-section, in general, the ducts can have any desired cross-sectional shape including, without limitation, circular, oval, triangular, polygonal, etc.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A duct assembly for flowing fluids, the assembly comprising:
   a first duct positioned above the ground, wherein the first duct is configured to flow a first fluid, wherein the first duct comprises a first fluid conduit;
   a second duct positioned above the ground, wherein the second duct is configured to flow a second fluid, wherein the first duct and the second duct isolate the first fluid and the second fluid from each other, wherein the second duct comprises a second fluid conduit;
   a stand supporting the first duct and the second duct above the ground, wherein the stand has an upper end positioned below the first duct and the second duct, wherein the first duct is seated on the upper end of the stand and the second duct is positioned above the first duct; and
   a plurality of laterally spaced struts vertically disposed between the first fluid conduit and the second fluid conduit, wherein each strut is oriented parallel to a the first longitudinal axis of the first duct.

2. The duct assembly of claim 1, wherein the first fluid conduit has an upper surface opposed to a lower surface of the second fluid conduit, and wherein the struts engage the upper surface of the first fluid conduit and the lower surface of the second fluid conduit.

3. The duct assembly of claim 2, wherein the struts are fixably attached to the first fluid conduit or the second fluid conduit.

4. The duct assembly of claim 1, wherein the second duct has a second longitudinal axis oriented parallel to the first longitudinal axis;
   wherein the first duct comprises a first elongate reinforcement member fixably attached to the first fluid conduit;
   wherein the second duct comprises a second elongate reinforcement member fixably attached to the second fluid conduit;
   wherein the first elongate reinforcement member is oriented parallel to the first longitudinal axis and the second elongate reinforcement member is oriented parallel to the second longitudinal axis.

5. The duct assembly of claim 1, wherein the first duct is disposed at a first height measured vertically from the ground, the second duct is disposed at a second height measured vertically from the ground, and the stand has a third height measured vertically from the ground;
   wherein the third height is less than or equal to the first height and wherein the third height is less than or equal to the second height.

6. The duct assembly of claim 1, wherein the first duct and the second duct are seated directly on the upper end of the stand.

7. The duct assembly of claim 1, wherein the stand comprises a first vertical column, a second vertical column, and a support base coupled to an upper end of the first vertical column and an upper end of the second vertical column, wherein the first duct is seated directly on the support base.

8. A duct assembly for flowing fluids, the assembly comprising:
   a first duct positioned at a first height measured vertically from the ground, wherein the first duct comprises a first fluid conduit;
   a stand supporting the first duct above the ground, wherein the stand has an upper end positioned at a second height measured vertically from the ground;
   a second duct positioned at a third height measured vertically from the ground, wherein the second duct comprises a second fluid conduit;
   a plurality of elongate struts vertically disposed between the first fluid conduit and the second fluid conduit, wherein each elongate strut is oriented parallel to a first longitudinal axis of the first duct;
   wherein the second height is less than or equal to the first height;
   wherein the stand supports the second duct above the ground;
   wherein the second height is less than or equal to the third height;
   wherein the first height is equal to the third height.

9. The duct assembly of claim 8, further comprising a single layer of insulation positioned between the first fluid conduit and the second fluid conduit.

10. The duct assembly of claim 8, wherein the plurality of elongate struts are oriented parallel to each other.

11. The duct assembly of claim 8, wherein the second duct has a second longitudinal axis oriented parallel to the first longitudinal axis;
    wherein the first duct comprises a first elongate reinforcement member fixably attached to the first fluid conduit;
    wherein the second duct comprises a second elongate reinforcement member fixably attached to the second fluid conduit;
    wherein the first elongate reinforcement member is oriented parallel to the first longitudinal axis and the second elongate reinforcement member is oriented parallel to the second longitudinal axis.

12. The duct assembly of claim 11, wherein the first elongate reinforcement member is attached to a lateral side of the first fluid conduit; and wherein the second elongate reinforcement member is attached to a lateral side of the second fluid conduit.

13. A duct assembly for flowing a first fluid and a second fluid, the duct assembly comprising:
- a first duct having a first longitudinal axis and configured to flow the first fluid, wherein the first duct comprises a first fluid conduit;
- a second duct positioned above the first duct, wherein the second duct has a second longitudinal axis oriented parallel to the first longitudinal axis, wherein the second duct is configured to flow the second fluid, wherein the second duct comprises a second fluid conduit;
- a plurality of laterally spaced struts vertically disposed between the first fluid conduit and the second fluid conduit, wherein each strut is oriented parallel to the first longitudinal axis.

14. The duct assembly of claim 13, wherein each strut engages the first fluid conduit and the second fluid conduit.

15. The duct assembly of claim 14, wherein each strut is fixably attached to the first fluid conduit or the second fluid conduit.

16. The duct assembly of claim 13, wherein the first duct comprises a first elongate reinforcement member fixably attached to the first fluid conduit;
- wherein the second comprises a second elongate reinforcement member fixably attached to the second fluid conduit;
- wherein the first elongate reinforcement member is oriented parallel to the first longitudinal axis and the second elongate reinforcement member is oriented parallel to the second longitudinal axis.

* * * * *

UNITED STATES PATENT AND TRADEMARK OFFICE
CERTIFICATE OF CORRECTION

PATENT NO. : 10,167,982 B2
APPLICATION NO. : 15/205264
DATED : January 1, 2019
INVENTOR(S) : Dennis W. Johnson et al.

It is certified that error appears in the above-identified patent and that said Letters Patent is hereby corrected as shown below:

In the Claims

Column 11, Line 53, between "a" and "first", delete "the"

Signed and Sealed this
Nineteenth Day of March, 2019

Andrei Iancu
*Director of the United States Patent and Trademark Office*